United States Patent

Hakozaki

[11] Patent Number: 6,160,908
[45] Date of Patent: Dec. 12, 2000

[54] CONFOCAL MICROSCOPE AND METHOD OF GENERATING THREE-DIMENSIONAL IMAGE USING CONFOCAL MICROSCOPE

[75] Inventor: Hiroyuki Hakozaki, Yokohama, Japan

[73] Assignee: Nikon Corporation, Tokyo, Japan

[21] Appl. No.: 08/975,990

[22] Filed: Nov. 21, 1997

[30]       Foreign Application Priority Data

Dec. 2, 1996   [JP]   Japan ................................ 8-336421

[51] Int. Cl.[7] ................................................. G06K 9/00
[52] U.S. Cl. ....................... 382/154; 250/234; 250/201.3; 348/79
[58] Field of Search .............................. 359/393; 250/234, 250/235, 201.3, 559.07, 559.22, 559.2, 559.48; 356/36, 12; 382/154, 131, 141; 348/79

[56]              References Cited

U.S. PATENT DOCUMENTS

| Re. 34,214 | 4/1993 | Carlsson et al. | 358/93 |
|---|---|---|---|
| 4,689,491 | 8/1987 | Lindow et al. | 250/559.07 |
| 4,810,869 | 3/1989 | Yabe et al. | 250/201 |
| 4,893,008 | 1/1990 | Horikawa | 250/234 |
| 5,479,252 | 12/1995 | Worster et al. | 356/237 |

FOREIGN PATENT DOCUMENTS 0 330 008   8/1989   European Pat. Off. .

OTHER PUBLICATIONS

Boyde, A. Stereoscopic Images in Confocal (Tandem Scanning) Microscopy. Science, vol. 230. pp 1270–1272, Dec. 13, 1985.

*Primary Examiner*—Bhavesh Mehta
*Attorney, Agent, or Firm*—Vorys, Sater, Seymour and Pease LLP

[57]              ABSTRACT

A confocal microscope has a light source, a scanning device for two-dimensionally scanning light from the light source on a specimen, an objective lens arranged between the scanning device and the specimen, a driving device for moving the objective lens and the specimen relative to each other in the optical axis direction of the objective lens, a control circuit for simultaneously driving the scanning device and the driving device, and controlling the scanning speed of the scanning device and the moving speed of the driving device, an image acquisition device for detecting light from the specimen while the scanning device and the driving device are being driven, and acquiring slice images of the specimen on planes respectively perpendicular to two inclined axes which are symmetrical about the optical axis or an axis inclined from the optical axis, and a display device for displaying a stereoscopic image of the specimen on the basis of the images acquired by the image acquisition device.

5 Claims, 6 Drawing Sheets

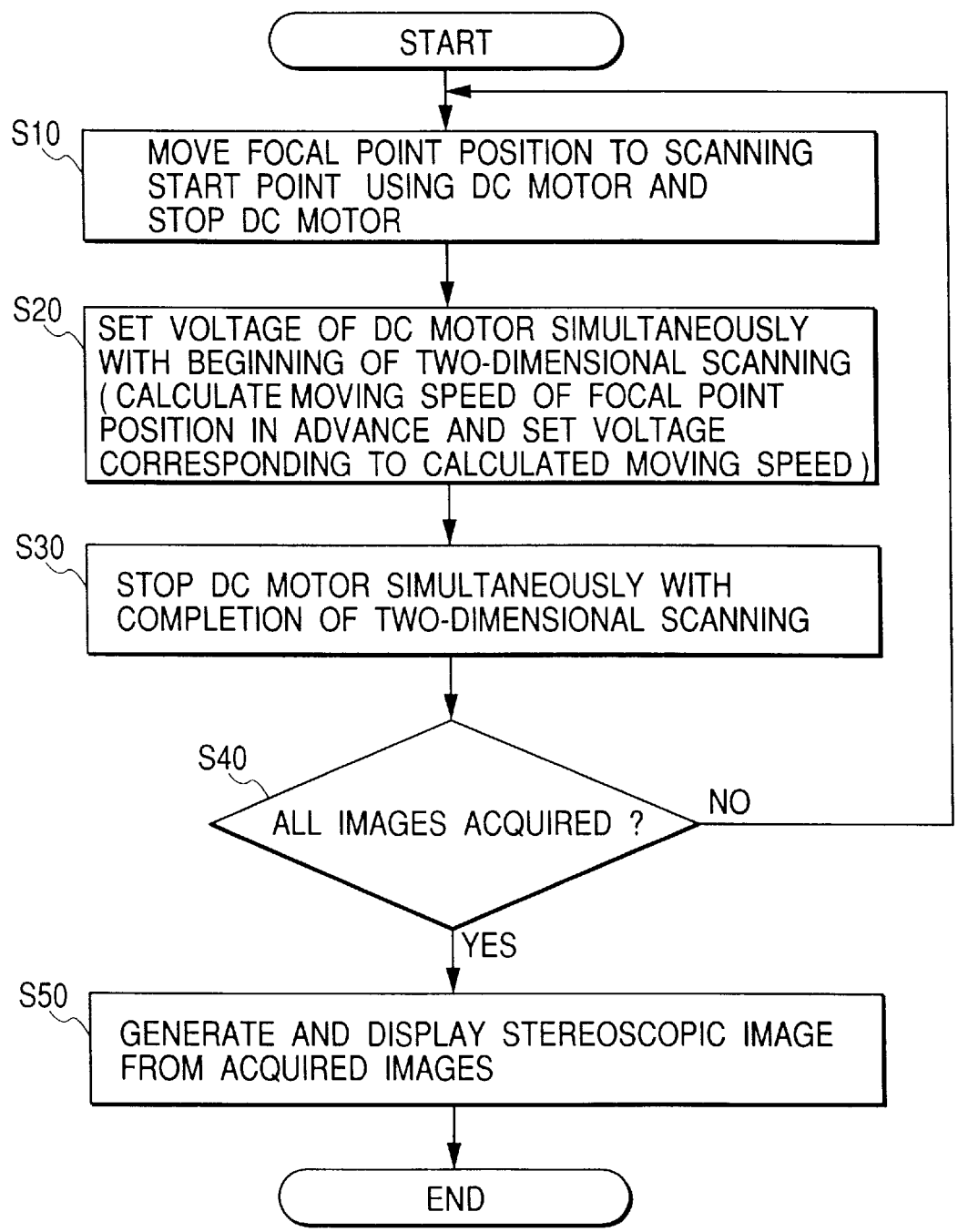

CONFOCAL MICROSCOPE AND METHOD OF GENERATING THREE-DIMENSIONAL IMAGE USING CONFOCAL MICROSCOPE

The entire disclosure of Japanese Patent Application No. 8-336421 including specification, claims, drawings and summary is incorporated herein by reference in its entirety.

BACKGROUND OF THE INVENTION

1. Field of the Invention

The present invention relates to a confocal microscope and a method of generating a three-dimensional image using a confocal microscope.

2. Related Background Art

A confocal microscope mainly comprises a laser light source, a dichroic mirror, a two-dimensional scanning unit for two-dimensionally scanning excitation light, an objective lens, a focusing lens, a pinhole formed on the focal plane of the focusing lens, and a photodetector.

Excitation light emitted by the laser light source is reflected by the dichroic mirror, and is brought into focus on a specimen via the two-dimensional scanning unit and the objective lens. Fluorescence produced by the specimen upon irradiation of the excitation light is transmitted through the dichroic mirror via the objective lens and the two-dimensional scanning unit. The fluorescence transmitted through the dichroic mirror is brought into focus on the pinhole set in the optical path by the focusing lens. At this time, only fluorescent components originating from the focal point of the excitation light pass through the pinhole, and are received by a detection device. The detection device outputs an electrical signal corresponding to the amount of received light. This signal and scanning position information are subjected to predetermined processing using a computer to obtain a slice image (a fluorescent image or a reflection image) of the specimen.

FIG. 7 is an explanatory view of the method of generating a three-dimensional image using the conventional confocal microscope.

By changing the distance (focal length) between the objective lens and a specimen, slice images of a plurality of planes E1 to E4 perpendicular to an optical axis L10 are acquired at the individual focal points. A three-dimensional image is generated by interpolating upper and lower slice images using a computer, and the generated image is displayed. This technique is disclosed in U.S. Pat. No. Re. 34,214.

FIG. 8 is an explanatory view of the method of obtaining an inclined slice image from the slice images shown in FIG. 7, and FIG. 9 is an explanatory view of the method of generating a three-dimensional image from the inclined slice images.

An image on a plane perpendicular to the optical axis L10 is projected onto planes F1 and F2 which are perpendicular to axes L20 and L30 which are slightly inclined from the optical axis L10 and are symmetrical about the optical axis L10. Images F11 to F14 and F21 to F24 obtained by projection at the individual focal points are sequentially overlaid on each other while being shifted in accordance with their inclinations. With this processing, images viewed from different directions are generated. These images are juxtaposed to display a three-dimensional image using stereoscopic viewing or the like, or the images are overlaid on each other while changing their colors, and a three-dimensional image is generated using color spectacles.

On the other hand, in place of projecting images, a pseudo three-dimensional image can be displayed by overlaying images obtained at the individual focal points while shifting them.

With the method shown in FIG. 7, a three-dimensional image that suffers less distortion can be generated, and can be easily rotated. However, since the generation and rotation of the three-dimensional image require many calculations, an expensive computer is required to obtain a three-dimensional image at high speed.

In the method shown in FIGS. 8 and 9, calculations for projection must be done by a computer, and it is time-consuming to generate a three-dimensional image.

Furthermore, in the method that does not perform any projection, the calculations of a computer are facilitated, and a three-dimensional image can be generated at high speed. However, since a three-dimensional image is directly generated on the basis of images obtained by scanning on planes perpendicular to the optical axis, spatial distortion is produced.

SUMMARY OF THE INVENTION

The present invention has been made in consideration of the above situation, and has as its object to provide a confocal microscope and a method of generating a three-dimensional image using the confocal microscope, which can perform high-speed calculations and generate and rotate a three-dimensional image free from any distortion at high speed without using any expensive computer.

In order to achieve the above object, a confocal microscope according to the present invention comprises:

a light source;

a scanning device for two-dimensionally scanning light from the light source on a specimen;

an objective lens arranged between the scanning device and the specimen;

a driving device for moving the objective lens and the specimen relative to each other in an optical axis direction of the objective lens;

a control circuit for simultaneously driving the scanning device and the driving device, and controlling a scanning speed of the scanning device and a moving speed of the driving device;

an image acquisition device for detecting light from the specimen while the scanning device and the driving device are being driven, and acquiring slice images of the specimen on planes respectively perpendicular to two inclined axes which are symmetrical about the optical axis or an axis inclined from the optical axis; and a display device for displaying a stereoscopic image of the specimen on the basis of the images acquired by the image acquisition device.

Since scanning by the scanning device and movement in the optical axis direction by the driving device are simultaneously performed, and the moving speed of the driving device with respect to the scanning speed is controlled, a plurality of slice images on planes perpendicular to two inclined axes symmetrical about the optical axis or an axis inclined from the optical axis can be obtained. The obtained images are stereoscopically displayed by the display device while being distinguished into those for the right and left eyes, respectively.

BRIEF DESCRIPTION OF THE DRAWINGS

FIG. 3 is a flow chart for explaining the control method of a two-dimensional scanning unit and a driving unit by a control unit;

DESCRIPTION OF THE PREFERRED EMBODIMENTS

The preferred embodiments of the present invention will be described hereinafter with reference to the accompanying drawings.

Figure 1:
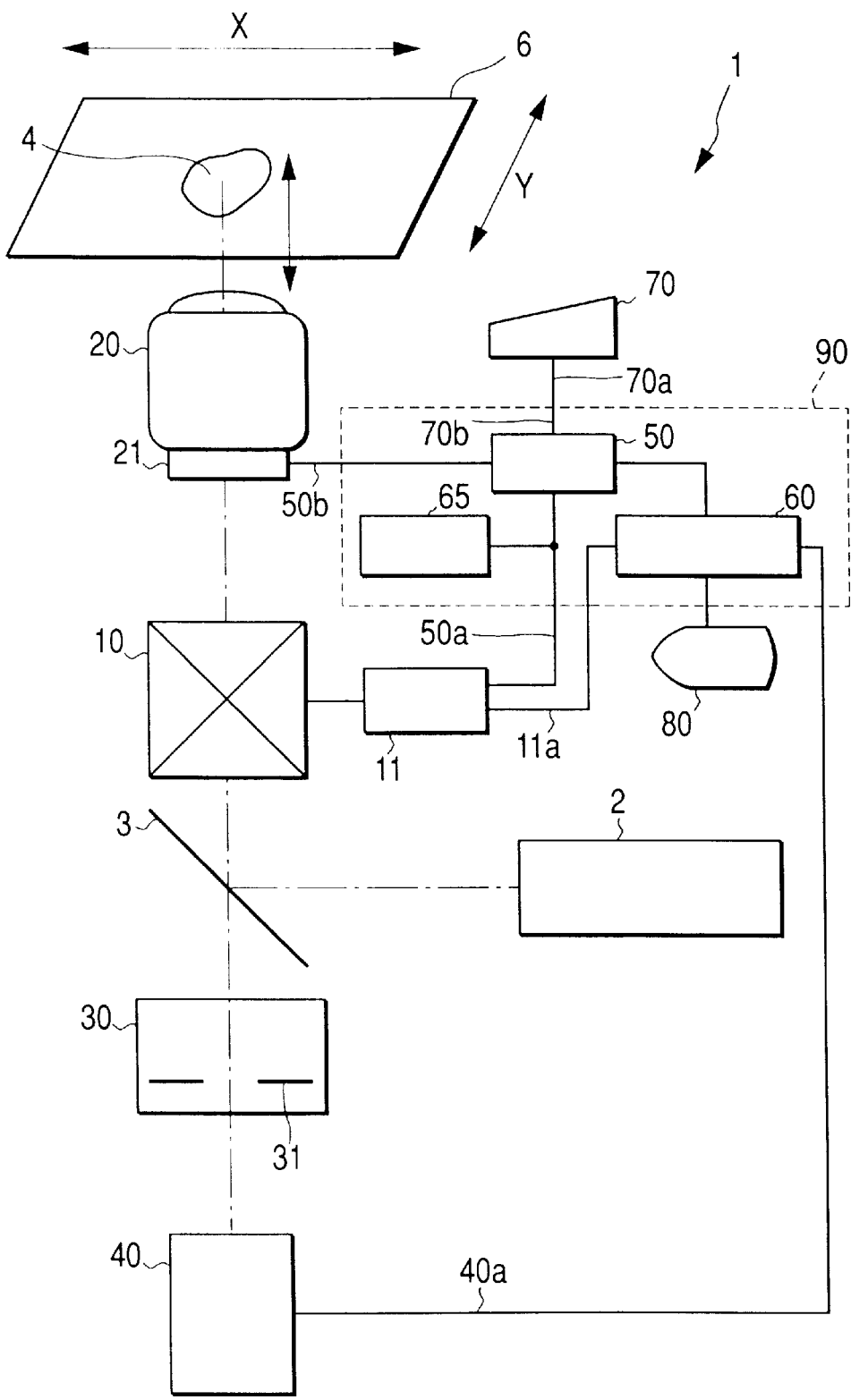
FIG. 1 is a block diagram showing the arrangement of a confocal microscope according to the present invention.

FIG. 1 is a block diagram showing the arrangement of a confocal microscope according to the first embodiment of the present invention.

A confocal microscope 1 comprises a light source 2, a dichroic mirror 3, a two-dimensional scanning unit (scanning means) 10, an objective lens 20, a focusing unit 30, a fluorescent detector (detection means) 40, a CPU (control unit) 50, and an image processing circuit 60.

The light source 2 emits an excited laser beam which irradiates a specimen 4 placed on a stage 6.

The dichroic mirror 3 separates the excited laser beam and fluorescence produced by the specimen 4.

The two-dimensional scanning unit 10 comprises horizontal and vertical scanners which are scanned in the X- and Y-directions by a scanner driving device 11. The scanner driving device 11 is controlled by a scanning position signal 50a for instructing the scanning position, which is output from the CPU 50, and two-dimensionally scans the excited laser beams on the specimen 4 at a predetermined scanning speed. The horizontal and vertical scanners may comprise galvano scanners or resonant scanners.

The objective lens 20 is arranged between the two-dimensional scanning unit 10 and the specimen 4, and is moved by an objective lens driving unit (driving means) 21 in the optical axis direction with respect to the specimen 4.

The objective lens driving unit 21 is controlled by a movement signal 50b, which is output from the CPU 50 and instructs the moving speed and direction in the optical axis direction.

The objective lens driving unit 21 comprises a DC motor. As the DC motor, a DC servo motor is preferably used since it has the following features: (1) high-speed response characteristics, (2) a large torque, and easy control circuit design since the torque is generated proportional to a voltage applied, and (3) high efficiency.

The focusing unit 30 is arranged between the dichroic mirror 3 and the fluorescence detector 40, and comprises a focusing lens (not shown) for focusing fluorescence separated by the dichroic mirror 3 and a pinhole 31 formed at a position conjugate with the focal plane of the objective lens 20. Hence, the pinhole 31 passes only fluorescence components produced at the imaging portion of the specimen 4.

The fluorescence detector 40 detects fluorescence of the specimen 4 that has passed through the pinhole 31, and converts the input fluorescence into a signal 40a representing a light intensity.

The image processing circuit 60 comprises image forming circuits such as an A/D converter, a frame memory, a D/A converter, and the like, and an overlay memory circuit for overlaying images in accordance with an instruction from the CPU 50.

The image processing circuit 60 generates a three-dimensional image of the specimen 4 by performing predetermined processing of a fluorescence image of the specimen 4 and slice images of reflection images obtained from the signal 40a output from the fluorescence detector 40 and a scanning position signal 11a output from the scanner driving device 11 in accordance with an instruction from the CPU 50, and displays the generated image on, e.g., a monitor 80.

The CPU 50 outputs the scanning position signal 50a and the movement signal 50b on the basis of information which is input by the user via a keyboard 70 and stored in a memory 65 upon acquiring an image. In this embodiment, the CPU 50, image processing circuit 60, and memory 65 use some components of a personal computer 90.

Figure 2:
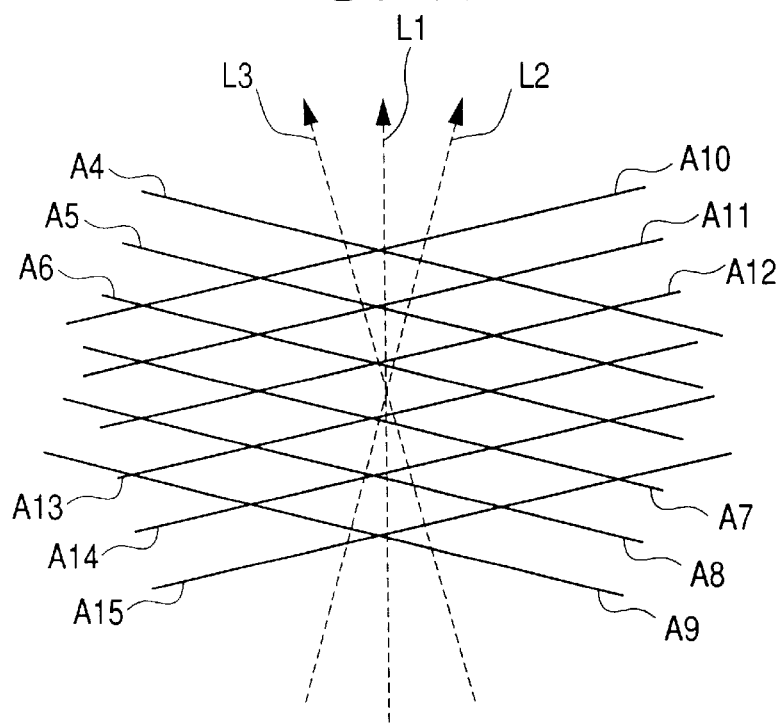
FIG. 2 is an explanatory view of the method of generating a three-dimensional image using the confocal microscope according to the first embodiment of the present invention.

FIG. 2 is an explanatory view of the method of generating a three-dimensional image using the confocal microscope according to the first embodiment of the present invention (a view from the X-direction), and FIG. 3 is a flow chart for explaining the method of controlling the two-dimensional scanning unit and the driving unit by the control unit. In FIG. 3, S10 to S50 indicate steps.

In FIG. 2, axes L2 and L3 are located at symmetric positions to have an optical axis L1 as the center, and the CPU 50 obtains slice images on a plurality of planes A4 to A9 and A10 to A15 perpendicular to these axes L2 and L3.

The control operation by the CPU 50 will be described below with reference to FIGS. 1 to 3.

The user inputs image acquisition conditions (the moving distance in the optical axis direction, the number of images to be acquired, and the like) 70a from the keyboard 70. The information 70a input by the user is stored in the memory 65.

The focal point position is moved to the scanning start point using a DC motor, and the objective lens 20 is stopped at that position (S10).

When an image acquisition signal 70b is input, the two-dimensional scanning unit 10 starts constant-speed two-dimensional scanning on the basis of the scanning position signal 50a, and at the same time, the DC motor is driven on the basis of the movement signal 50b to move the objective lens 20 in the optical axis direction.

At this time, since the moving speed and direction of the objective lens 20 are determined on the basis of the information input by the user at the keyboard 70, the rotational speed of the DC motor corresponding to the moving speed is calculated in advance, and the voltage applied to the DC motor is changed to attain that rotational speed. In addition, the rotational speed is controlled by, e.g., servo control, and at the same time, the polarity of the power supply is changed in correspondence with the moving direction (S20).

With this control, two-dimensional scanning can be done at an inclination to be acquired. For example, when six slice images are to be acquired during a moving distance of 10 μm, the moving speed is (5/3) μm/(time required for acquiring a single slice image).

The DC motor is stopped simultaneously with the completion of two-dimensional scanning by the two-dimensional scanning unit 10 (S30).

With the above operation, since a slice image on the single plane A4 can be obtained, the obtained image is stored in, e.g., the frame memory.

The above-mentioned operations are repeated until all the images are acquired (S40). After slice images on the planes A4 to A9 for the left eye are acquired, slice images on the planes A15 to A10 for the right eye are acquired, and the acquired images are stored in the frame memory.

After slice images for all the images are acquired, an image obtained by overlaying the slice images on the planes A4 to A9 for the left eye and an image obtained by overlaying the slice images on the planes A15 to A10 for the right eye using the overlay memory circuit are stereoscopically observed by alternately switching them using, e.g., shutter spectacles, or these images are displayed on a stereoscopic monitor, thus generating a three-dimensional image (S50).

Since the slice images on the planes A4 to A9 for the left eye are acquired, and thereafter, the slice images on the planes A15 to A10 for the right eye are acquired, the moving distance (moving time) of the objective lens 20 can be shortened, and a three-dimensional image can be generated at high speed.

On the other hand, the obtained images may be colored (for example, the image for the left eye may be colored in blue, and the image for the right eye may be colored in red) and be displayed to overlap each other, and a three-dimensional image may be obtained using color spectacles.

According to the first embodiment, since the slice images are perpendicular to the axes L2 and L3, a three-dimensional image free from any spatial distortion can be generated.

Figure 4:
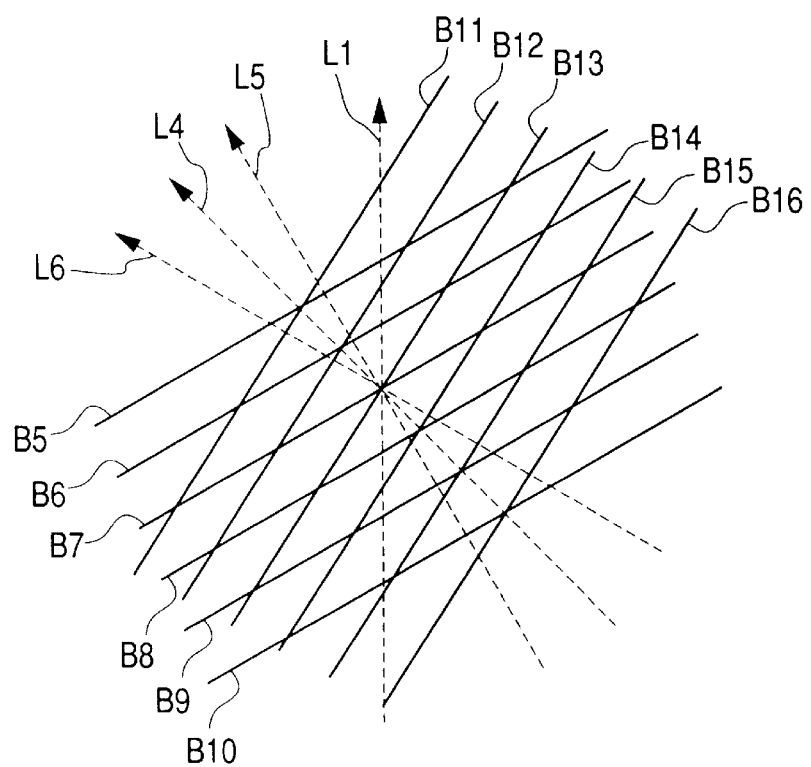
FIG. 4 is an explanatory view of the method of generating a three-dimensional image using the confocal microscope according to the second embodiment of the present invention.

FIG. 4 is an explanatory view of the method of generating a three-dimensional image using the confocal microscope according to the second embodiment of the present invention (a view from the X-direction).

The first embodiment obtains slice images on a plurality of planes A1 to A15 perpendicular to the two axes L2 and L3 which are symmetrical about the optical axis L1, while the second embodiment obtains slice images on planes B5 to B16 perpendicular to two axes L5 and L6, which are symmetrical about an axis L4 which is inclined a predetermined angle with respect to the optical axis L1.

The CPU 50 obtains slice images on the planes B5 to B16 by controlling two-dimensional scanning by the two-dimensional scanning unit 10 and the movement of the objective lens 20 in the optical axis direction by the DC motor as in the first embodiment, and generates a three-dimensional image from a plurality of slice images on the planes B5 to B16.

According to the second embodiment, the same effect as in the first embodiment can be expected, and a three-dimensional image observed from the axis L4 offset from the optical axis L1 can be observed without rotating the specimen 4.

Figure 5:
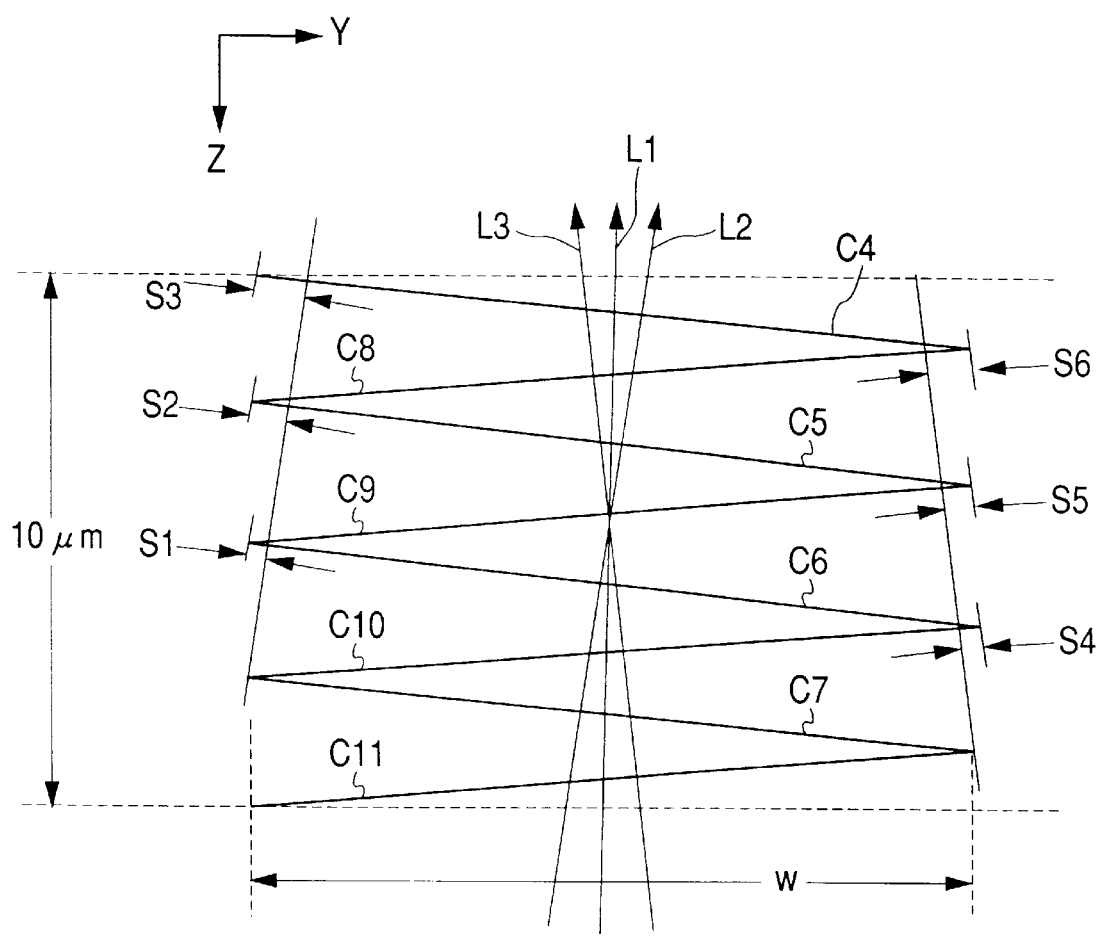
FIG. 5 is an explanatory view of the method of generating a three-dimensional image using the confocal microscope according to the third embodiment of the present invention.

FIG. 5 is an explanatory view of the method of generating a three-dimensional image using the confocal microscope according to the third embodiment of the present invention (a view from the X-direction).

In the third embodiment, the objective lens 20 is moved in the optical axis direction (Z-direction) using a piezoelectric element in place of the DC motor, and during the two-dimensional scanning period of the two-dimensional scanning unit, scanning is also done in, e.g., the horizontal blanking period, i.e., reciprocal scanning is done.

When the piezoelectric element is used, the objective lens 20 cannot be moved continuously unlike the DC motor. Hence, a plurality of piezoelectric elements are arranged in the optical axis direction, and are selectively energized in a predetermined order, thereby moving the objective lens 20 stepwise by, e.g., 25 nm.

The CPU 50 obtains slice images by controlling energization of the piezoelectric elements to move the objective lens 20 in the optical axis direction simultaneously with the beginning of two-dimensional scanning by the two-dimensional scanning unit 10, and generates a three-dimensional image by overlaying these slice images.

Hence, when a total of eight slice images on planes C4 to C7 perpendicular to the axis L2 and on planes C8 to C11 perpendicular to the axis L3 are acquired in 10 μm like in this embodiment, one slice image is acquired every time the objective lens 20 is moved by 1.25 μm in the direction of the optical axis At this time, the slice images on the planes C8 to C11 obtained by backward scanning are reversed about the Y-direction and are stored in the frame memory. The stored images are overlaid by the overlay memory circuit.

Note that the slice images on the planes C4 to C7 and the slice images on the planes C8 to C11 are respectively overlaid while being shifted by predetermined amounts in correspondence with the inclinations of the axes L2 and L3, thereby generating a three-dimensional image.

These shift amounts are obtained based on the similar relationship of triangles. In this embodiment, shift amounts S1 and S4 are 1.25×2.5/sqrt(1.252+W2) μm (W is the length in the Y-direction), and shift amounts S2 and S5 are 2.5× 2.5/sqrt(1.252+W2) μm, and shift amounts S3 and S6 are 7.5×1.25/sqrt(1.252+W2) μm.

Note that W is the length in the Y-direction.

Mathematically, these shift amounts are given by:

$$S1, S4 = 1.25 \times 2.5 / \sqrt{(W^2 + 1.252)} \tag{1}$$

$$S2, S5 = 2.5 \times 2.5 / \sqrt{(W^2 + 1.252)} \tag{2}$$

$$S3, S6 = 7.5 \times 1.25 / \sqrt{(W^2 + 1.252)} \tag{3}$$

According to the third embodiment, since a three-dimensional image can be generated by moving the objective lens 20 in one way in the optical axis direction, the three-dimensional image can be generated at higher speed than the first embodiment.

Since the piezoelectric elements are used, the objective lens 20 can be moved on the μm order in correspondence with the number of times of application of a voltage, and the focal point position can be controlled more precisely than the DC motor.

When the piezoelectric elements are used, no reduction gear mechanism need be interposed between the piezoelectric elements and the objective lens 20 unlike the DC motor, and the entire structure of the objective lens driving unit 21 for moving the objective lens 20 can be rendered compact.

Figure 6:
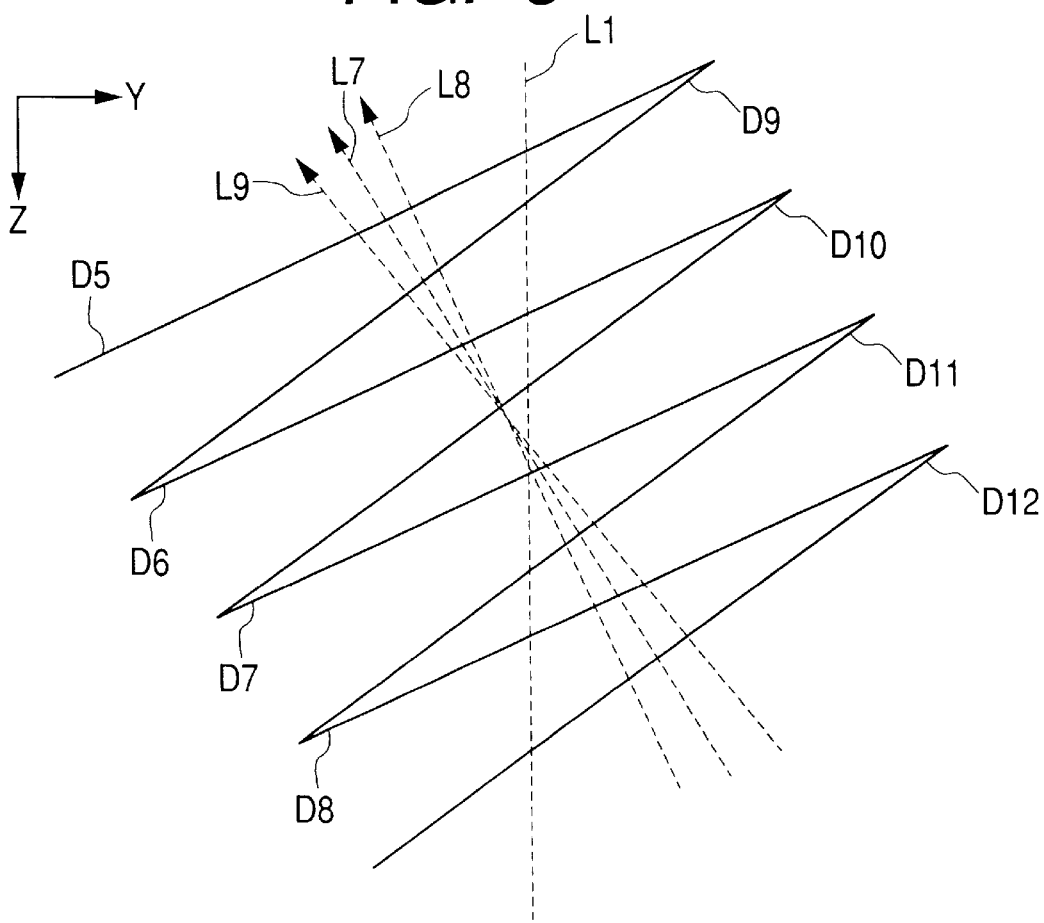
FIG. 6 is an explanatory view of the method of generating a three-dimensional image using the confocal microscope according to the fourth embodiment of the present invention.
Figure 7:
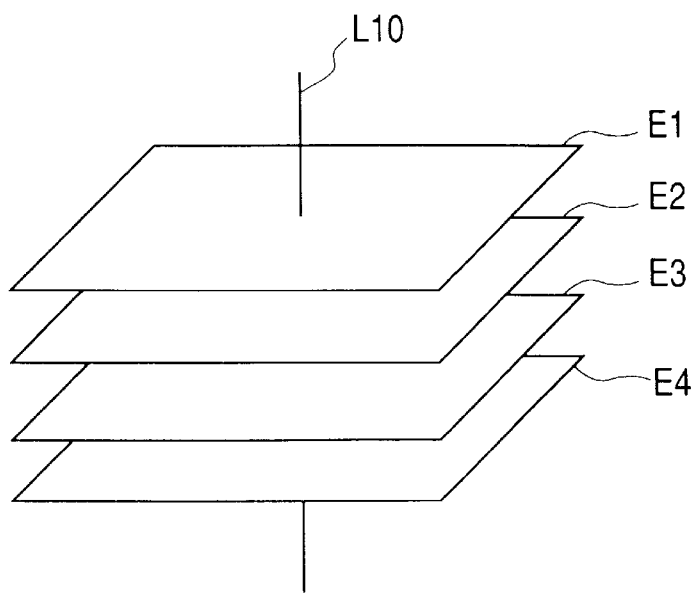
FIG. 7 is an explanatory view of the method of generating a three-dimensional image.
Figure 8:
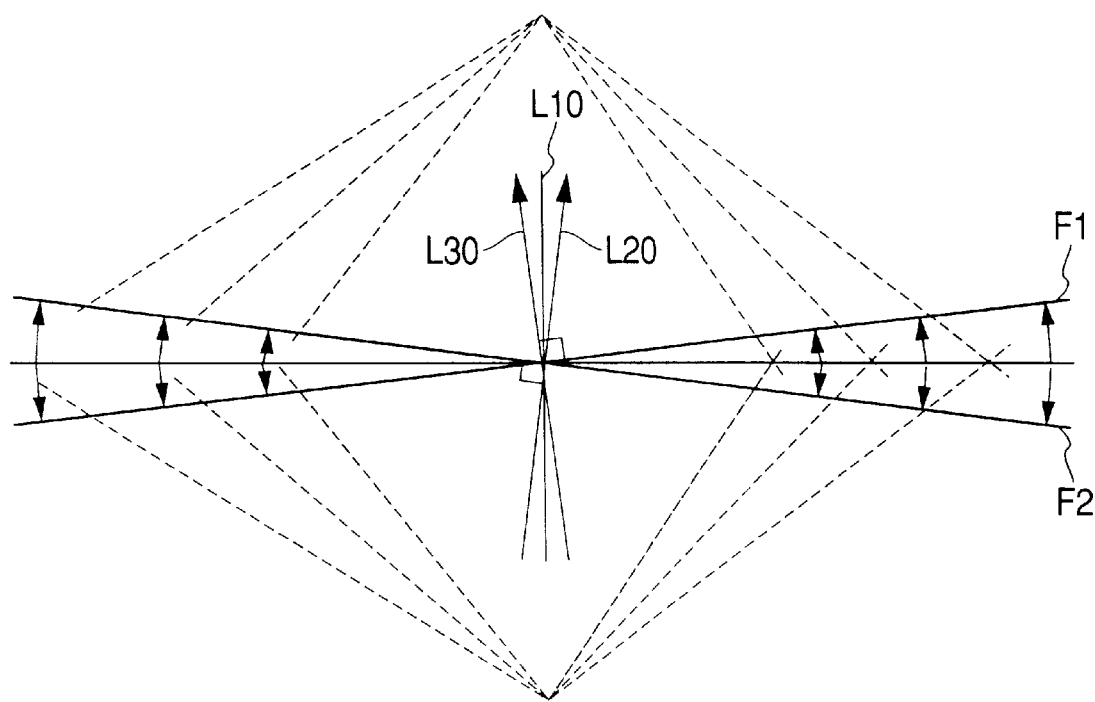
FIG. 8 is an explanatory view of the method of obtaining slice images.
Figure 9:
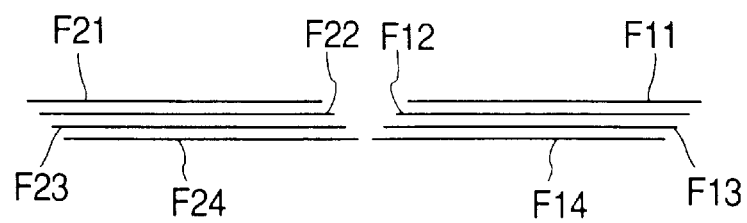
FIG. 9 is an explanatory view of the method of generating a three-dimensional image from the slice images.

FIG. 6 is an explanatory view of the method of generating a three-dimensional image using the confocal microscope according to the fourth embodiment of the present invention (a view from the X-direction).

The third embodiment obtains slice images on a plurality of planes C4 to C7 perpendicular to the two axes L2 and L3 which are symmetrical about the optical axis L1, while the fourth embodiment obtains slice images on planes D5 to D8 and planes D9 to D12 perpendicular to two axes L8 and L9 which are symmetrical about an axis L7, which is inclined a predetermined angle with respect to the optical axis The CPU 50 obtains a plurality of slice images by moving the objective lens 20 in the optical axis direction at a constant speed by driving the piezoelectric elements in the Z-direction simultaneously with the beginning of two-dimensional scanning by the two-dimensional scanning unit 10 as in the third embodiment, and generates a three-dimensional image from these slice images.

According to the fourth embodiment, the same effect as in the third embodiment can be expected, and a three-dimensional image observed from the axis L7 offset from the optical axis L1 can be observed without rotating the specimen 4 as in the second embodiment. Since no rotation using calculations of the computer is required, an image can be rotated at high speed.

In the above embodiments, the DC motor and the piezoelectric elements are used. Alternatively, a stepping motor (rotary type), an ultrasonic wave motor (rotary type), a stepping linear motor, and the like may be used. Also, the stage may be moved in place of moving the objective lens in the optical axis direction during two-dimensional scanning.

According to the first to fourth embodiments described above, since a plurality of slice images perpendicular to the two axes inclined from the optical axis are acquired, a three-dimensional image free from any distortion can be generated without using any expensive computer that can attain high-speed calculations.

What is claimed is:

1. A confocal microscope comprising:

a light source;

a scanning device for two-dimensionally scanning light from said light source on a specimen;

an objective lens arranged between said scanning device and the specimen;

a driving device for moving said objective lens and the specimen relative to each other in an optical axis direction of said objective lens;

a control circuit for simultaneously driving said scanning device and said driving device, and controlling a scanning speed of said scanning device and a moving speed of said driving device;

an image acquisition device for detecting light from the specimen while said scanning device and said driving device are being driven simultaneously, and acquiring slice images of the specimen on planes respectively perpendicular to two inclined axes which are symmetrical about the optical axis or an axis inclined from the optical axis; and a display device for displaying a stereoscopic image of the specimen on the basis of the images acquired by said image acquisition device.

2. A confocal microscope according to claim 1, wherein said image acquisition device acquires a plurality of slice images for each inclined axis, and overlays the plurality of acquired images.

3. A confocal microscope according to claim 1, further comprising:

an input device for inputting an image acquisition condition; and a storage device for storing the input image acquisition condition, and wherein said control circuit calculates scanning speed information and moving speed information on the basis of the stored image acquisition condition.

4. A confocal microscope comprising:

a light source;

a scanning device for two-dimensionally scanning light from said light source on a specimen;

an objective lens arranged between said scanning device and the specimen;

a driving device for moving said objective lens and the specimen relative to each other in an optical axis direction of said objective lens;

an image acquisition device for acquiring a slice image of the specimen by detecting light from the specimen; and a control circuit for simultaneously driving said scanning device and said driving device, and controlling a scanning speed of said scanning device and a moving speed of said driving device, wherein said image acquisition device acquires a slice image on a plane having an arbitrary inclination from a horizontal plane by simultaneously driving and controlling said scanning device and said driving device by said control circuit.

5. A method of acquiring a three-dimensional image of a specimen, comprising the steps of:

(a) bringing light emitted by a light source into focus on a specimen via an objective lens;

(b) two-dimensionally scanning the light on the specimen;

(c) removing light coming from portions other than a focal plane using a pinhole formed at a position conjugate with the focal plane of the objective lens;

(d) detecting light passing through the pinhole using detection means;

(e) moving the objective lens and the specimen relative to each other in an optical axis direction of the objective lens simultaneously with the two-dimensional scanning to acquire a slice image perpendicular to an axis inclined from the optical axis;

(f) repeating step (e) to acquire a plurality of slice images perpendicular to two inclined axes which are symmetrical about the optical axis or the axis inclined from the optical axis; and (g) stereoscopically displaying an image by performing arithmetic processing of the plurality of acquired images.

* * * * *